United States Patent
Hemberger et al.

[11] Patent Number: 6,088,647
[45] Date of Patent: Jul. 11, 2000

[54] PROCESS FOR DETERMINING A FUEL-INJECTION-RELATED PARAMETER FOR AN INTERNAL-COMBUSTION ENGINE WITH A COMMON-RAIL INJECTION SYSTEM

[75] Inventors: Hans-Hubert Hemberger, Notzingen; Juergen Koehler, Schorndorf, both of Germany

[73] Assignee: DaimlerChrysler AG, Stuttgart, Germany

[21] Appl. No.: 09/154,453

[22] Filed: Sep. 16, 1998

[30] Foreign Application Priority Data

Sep. 16, 1997 [DE] Germany ............... 197 40 608

[51] Int. Cl.⁷ .................................. B60T 7/12
[52] U.S. Cl. ........................... 701/104; 123/478
[58] Field of Search ............... 701/104; 123/478

[56] References Cited

U.S. PATENT DOCUMENTS

| | | |
|---|---|---|
| 5,176,122 | 1/1993 | Ito . |
| 5,723,780 | 3/1998 | Miwa et al. ............... 73/119 |
| 5,755,208 | 5/1998 | Bombarda et al. ......... 123/478 |
| 5,797,370 | 8/1998 | Kimura et al. ............. 123/478 |
| 5,865,158 | 2/1999 | Cleveland et al. ......... 123/478 |
| 5,890,078 | 3/1999 | Furuta ........................ 701/104 |
| 5,899,189 | 5/1999 | Adelsperger et al. ...... 701/104 |

FOREIGN PATENT DOCUMENTS

| | | |
|---|---|---|
| 0 742 361 | 5/1995 | European Pat. Off. . |
| 31 26 393 | 4/1982 | Germany . |
| 196 40 826 | 4/1997 | Germany . |
| 8-144826 | 6/1996 | Japan . |

*Primary Examiner*—John Kwon
*Attorney, Agent, or Firm*—Evenson, McKeown, Edwards & Lenahan, PLLC

[57] ABSTRACT

A process for determining at least one fuel-injection-related parameter for an internal-combustion engine with a common-rail fuel injection system individually for each engine combustion chamber and each injection operation is provided. The pressure in the distributor pressure space, which is assigned jointly to the engine combustion chambers, of the common-rail fuel injection system is detected for a respective fuel injection operation for a respective combustion chamber in its signal course via a pressure sensor of the distributor pressure space. From the detected pressure course, a pertaining pressure course pattern is obtained from which the at least one fuel-injection-related parameter is determined individually for each combustion space and each injection operation.

4 Claims, 3 Drawing Sheets

PROCESS FOR DETERMINING A FUEL-INJECTION-RELATED PARAMETER FOR AN INTERNAL-COMBUSTION ENGINE WITH A COMMON-RAIL INJECTION SYSTEM

BACKGROUND AND SUMMARY OF THE INVENTION

The invention relates to a process for determining at least one fuel-injection-related parameter for an internal-combustion engine with a common-rail fuel injection system individually for each engine combustion chamber and each injection operation. In particular, the invention relates to a process for determining the fuel quantity injected for each cylinder and per power cycle in an actual manner into the respective combustion chamber without taking the mean value. Specifically, in the case of a separate preinjection and main injection, the process separately determines the preinjection quantity and the main injection quantity of (1) the actual injection point in time, (2) of the actual opening duration of the injectors of the injection system, (3) of the injection points in time of the preinjection and the main injection in the case of a separate preinjection and main injection, (4) of the interval between the preinjection and the main injection and/or (5) of the actual injection pressure at the respective injection nozzle as the one or the several determined fuel-injection-related parameter(s).

From German Patent Document DE 31 26 393 C2 and U.S. Patent Document U.S. Pat. No. 5,176,122 as well as Japanese Published Patent Application JP 08144826 A, it is known to detect the pressure in the distributor pressure space, jointly assigned to the engine combustion chambers, of a common-rail fuel injection system. This is done by means of an assigned pressure sensor. The output signal of the pressure sensor is used for controlling or regulating the fuel injection. In this case, the pressure signal of this sensor is only used at one or a few points of its time sequence per power cycle of an engine combustion chamber, particularly for detecting the differential pressure before and after an injection operation and to determine from the pertaining pressure drop the injected fuel quantity.

This known approach in which only one or a few pressure values of a respective injection operation are used for determining a fuel-injection-related parameter is limited with respect to its achievable precision. The reason is that the output signal of the pressure sensor arranged in the distributor pressure space of the common-rail injection system has a complex course with one pressure break respectively for the fuel injection in each one of the usually several engine combustion chambers, in which case these pressure breaks rapidly follow one another with respect to time and are superimposed by pertaining pressure fluctuation effects and other disturbances. The pressure drop determined by means of two measured pressure values in a starting phase and in an end phase of a fuel injection operation is therefore not always a reliable measurement of the actually injected fuel quantity and other fuel-injection-related parameters.

From European Published Patent Application EP 0 742 361 A2, a process is known for detecting the fuel quantity delivered by an injection pump of a diesel engine and injected by way of injection ducts and assigned injection nozzles into the engine combustion chambers, during which, for the injection ducts, a respective pressure course curve during the delivery operation between the injection pump and the injection nozzles is detected and standardized. Subsequently, the surface integral of the standardized pressure course curve is formed. By an evaluation by means of a proportionality constant, the absolute fuel quantity is then determined from the surface integral.

The invention is based on the technical problem of providing a process of the above-mentioned type by which one or more fuel-injection-related parameter(s) can be determined with low sensor-related expenditures in a comparatively precise and reliable manner.

The invention solves this problem by providing a process for determining at least one fuel-injection-related parameter for an internal-combustion engine with a common-rail fuel injection system individually for each engine combustion chamber and each injection operation. In the case of this process, the pressure in the distributor pressure space, which is assigned jointly to the engine combustion spaces, of the common-rail fuel injection system is detected for a respective fuel injection operation for a respective cylinder not only at one or a few point(s) in time, but rather during its whole course via a pressure sensor of the distributor pressure space in a highly resolved manner. From the detected pressure course, a pertaining pressure course pattern is obtained from which, in turn, the one or more fuel-injection-related parameter(s) is/are determined individually for each combustion chamber and each injection operation. For this purpose, several conventional methods for the pattern recognition and classification can be used, which also include regression methods and discriminant methods. In each case by means of this approach of using the whole pressure course pattern for a respective injection, the pressure course in the distributor pressure space is used during the whole injection operation for determining the fuel-injection-related parameters, whereby a high precision can be achieved without the requirement of a high-cost sensor system for this purpose. On the contrary, the use of a conventional sensor system in the distributor pressure space is sufficient.

In the case of a process further developed according to the present invention, the one or more fuel-injection-related parameter(s) is/are determined by means of the obtained pressure course pattern using a neural network which, in this case, takes over the task of the recognition and analysis of the pressure course pattern. In this case, several functional values of the pressure course pattern are supplied to the neural network as an input vector.

Other objects, advantages and novel features of the present invention will become apparent from the following detailed description of the invention when considered in conjunction with the accompanying drawings.

DETAILED DESCRIPTION OF THE DRAWINGS

Figure 1:
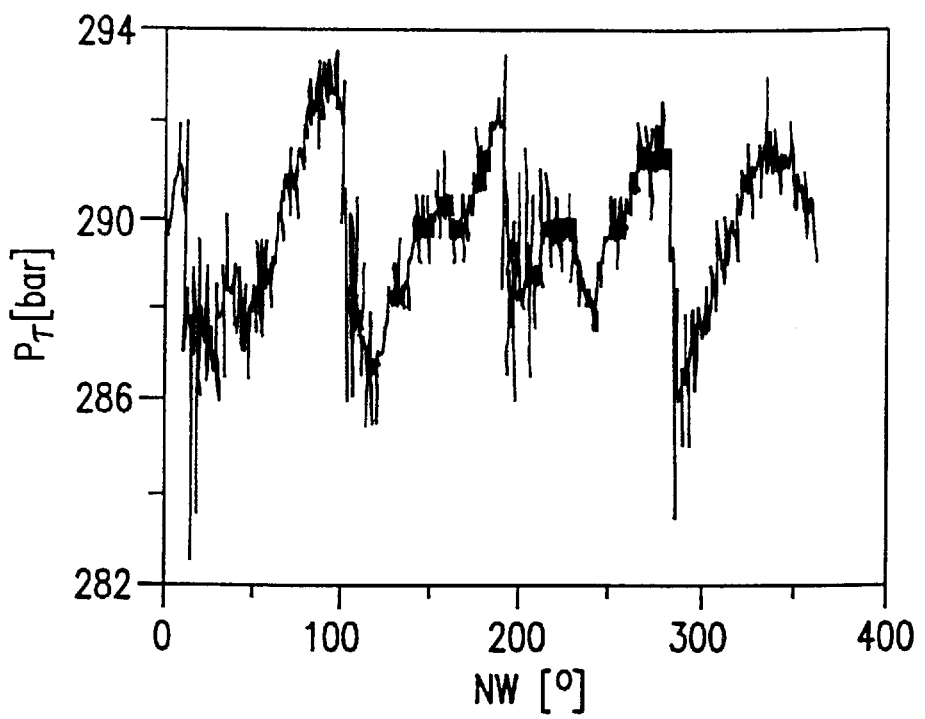
FIG. 1 is a diagram of the pressure course as a function of time in the distributor pressure line measured by a pressure sensor of a distributor pressure line of a common-rail fuel injection system of an internal-combustion engine.

The diagram of FIG. 1 shows a typical section of the fuel pressure course $P_r$ in the distributor pressure line during a power cycle measured by a conventional pressure sensor in the distributor pressure line of a common-rail injection system of an internal-combustion engine, for example, in a motor vehicle, as a function of the camshaft angle NW. This example relates to a four-cylinder internal-combustion engine. The pressure breaks in the area of the four fuel injections into the respective cylinders are clearly visible. It is demonstrated that the pressure breaks vary with respect to the course pattern in their shape, depth and duration at different operating points and injection quantities. The four-time injection per engine power cycle from the distributor pressure line which all cylinders have in common excites a fundamental pressure mode with four times the frequency of the rotational speed and additional harmonic oscillations. In addition, further disturbances are superimposed on the actual useful signal in the form of the pressure break. The pressure course data measured according to FIG. 1 represent raw data from whose further processing and analysis according to the process of the invention one or more fuel-injection-related parameter(s) is/are determined, such as (1) the injection quantity and/or the injection duration, optionally separately for preinjections and main injections; (2) the opening duration of the injection nozzles, that is, the injectors; (3) the time interval between the preinjection and the main injection and/or (4) the nozzle injection pressure. The parameters are each determined individually and in a non-standardized manner for each injection operation of each cylinder.

This highly resolved, determined pressure course raw signal is then subjected to signal preprocessing in order to obtain from it a pressure course pattern for each individual injection operation. For this purpose, the pressure course raw signal supplied by the pressure sensor is scanned by means of a defined resolution of, for example, a 1° crankshaft angle. The raw signal is then first low-pass filtered, for example, using a limit frequency of 900 Hz, in order to suppress any interfering noise. Subsequently, by means of a defined window, the pressure values within the time period of the respective considered fuel injection operation of one of the injectors are selected. Then, the pressure values within the window are appropriately related to a reference value, for example, to the first pressure value of the window cutout, and are standardized, whereby the pressure course pattern is obtained which pertains to the respective injection operation.

Figure 2:
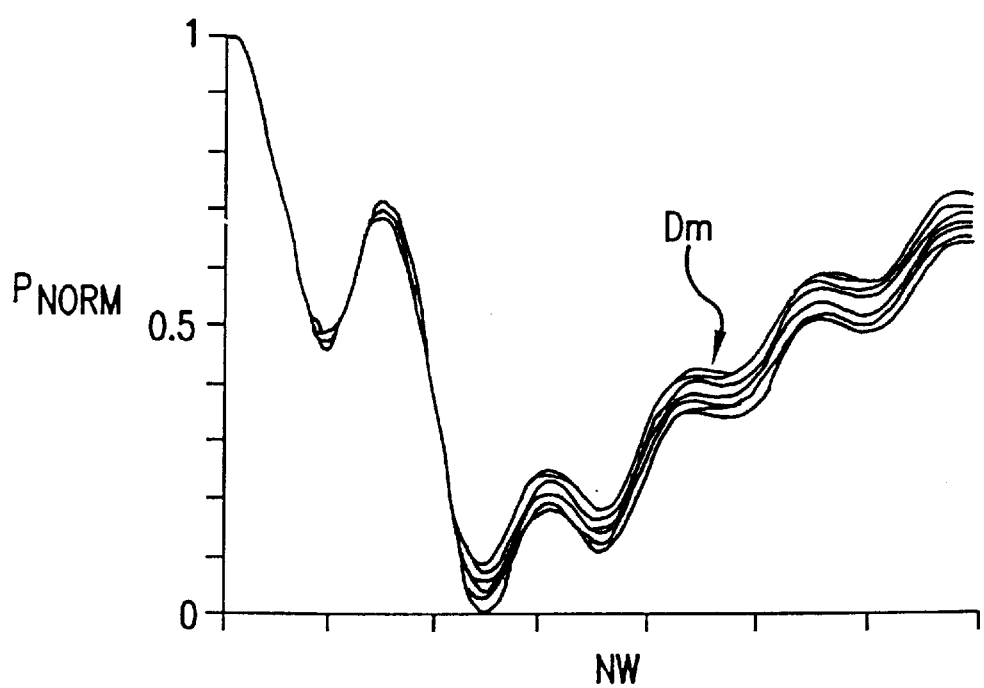
FIG. 2 is a diagram of the time sequence of pressure course patterns during a respective power cycle obtained by signal preprocessing from measured pressure courses corresponding to FIG. 1.

The diagram of FIG. 2 shows the pressure course patterns Dm which were obtained in this manner and scaled to a standardized pressure $P_{norm}$, which were derived, for example, from the measured pressure course of FIG. 1 in the range of a camshaft angles of approximately 180° and 220°. In this case, FIG. 2 shows ten pressure course patterns Dm which were all obtained for the same engine power point, that is, at the same rotational engine speed and engine load, from ten successive power cycles. FIG. 2 shows that all ten pressure course patterns Dm are essentially identical; that is, the patterns of their curve courses largely coincide. The slight recognizable deviations between the individual pressure course patterns Dm are based on slight differences of the injection quantity despite the same power point, which is essentially the result of a scattering of the actual quantity actually injected by the pertaining injection injector while the desired quantity is the same. It was found that the respective actually injected fuel quantity correlates very well with the shape and position of the pressure break, represented, for example, in FIG. 2, in the distributor pressure line of the common-rail fuel injection system, which justifies drawing a clear conclusion on the pertaining fuel injection amount from the respectively obtained pressure course pattern Dm. A corresponding situation applies not only to the fuel injection quantity, but also to the other injection-related parameters, such as the start of the injection and the duration of the injection.

Different method can be used for obtaining the pertaining value to be determined of the considered injection-related parameter from the respectively obtained pressure course pattern. In particular, different methods can be used here for pattern recognition and classification, which also include regression methods and discriminant methods. Artificial neural networks are particularly well suited for carrying out this pattern recognition task. As known, such networks can approximate very complex non-linear functions and are distinguished by their capability to learn by means of examples. In a monitored training phase, input quantities and desired output quantities are applied to the network. A learning algorithm provides that errors in the case of training data are minimized and the dependencies implied thereby are taken over into the network. Another advantage is the capability of neural networks to be able to achieve good results also in the case of noisy and imperfect data.

Figure 3:
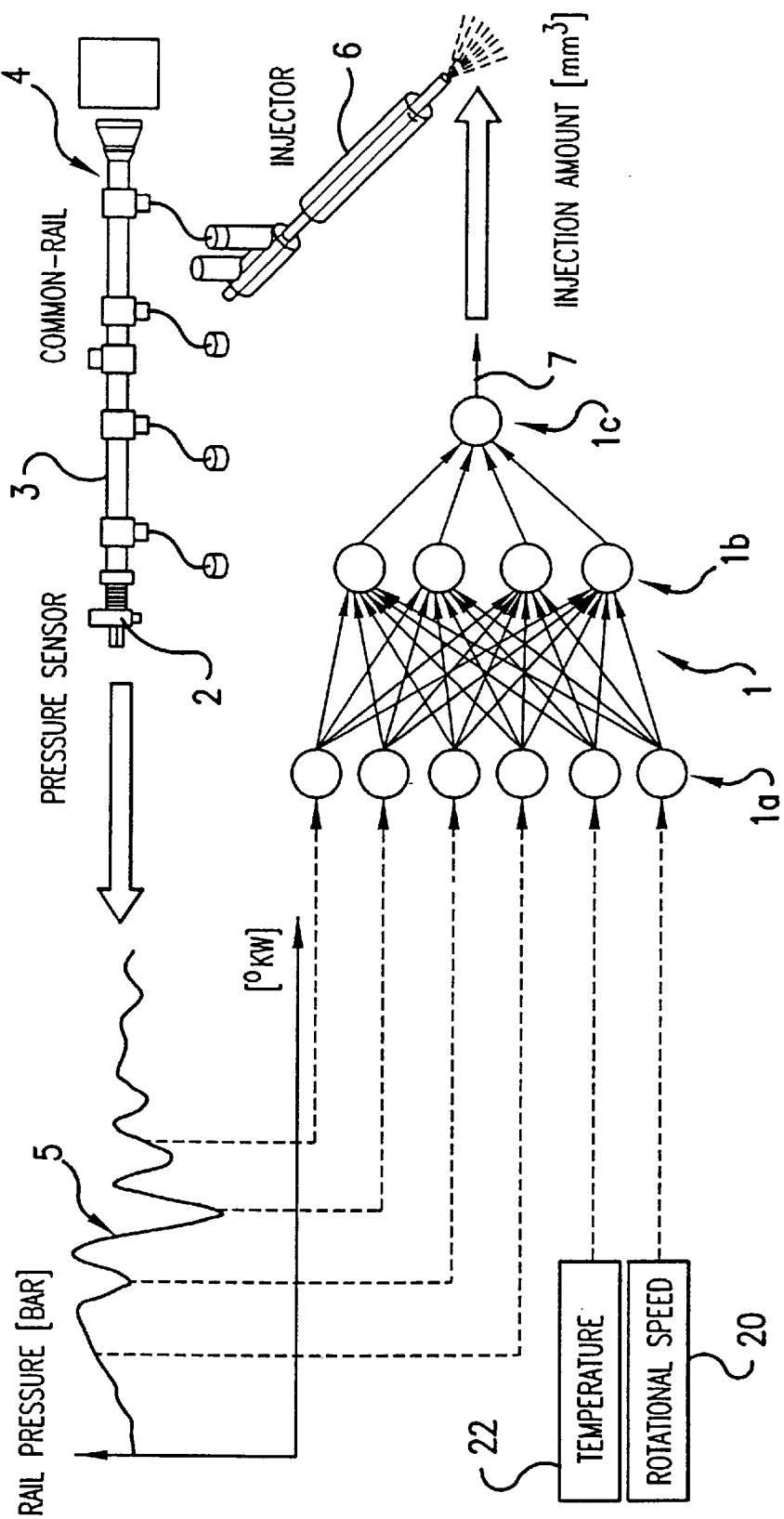
FIG. 3 is a schematic block diagram of a process for determining the fuel injection quantity per combustion chamber and power cycle for an internal-combustion engine with a common-rail fuel injection system while using a neural network and the process steps illustrated in FIGS. 1 and 2.

FIG. 3 shows an example of a process in which such a neural network 1 is used. In this example, the pressure course raw signal is first subjected by means of a conventional pressure sensor 2 of a distributor pressure line 3 of a motor vehicle's common-rail injection system 4 to signal preprocessing of the above-explained type; that is, a scanning by means of a, for example, 1° crankshaft angle, a low-pass filtering, and a selecting of the pressure values within the time period of an injection operation of an injector, for example, from the range of a −30° to +37° crankshaft angle. Further, during this signal preprocessing, the first pressure value of the window cutout was subtracted from all pressure values of the window in order to relate the pressure course curves to a uniform level. Then, the pressure course curves were standardized to the interval between 0.2 and 0.8. The resulting pressure course pattern 5 is then supplied to the neural network 1 together with the previously subtracted first pressure value as a reference pressure level as well as the rotational engine speed 20 and the engine temperature 22 as the input vector.

Specifically, a so-called multilayer perceptron network with an input layer 1a, a hidden layer 1b and an output layer 1c was used as the neural network 1. A sigmoid activation function was assigned to the neurons. For the hidden layer 1b, for example, a number of approximately 50 neurons was found to be favorable. The training of the network 1 took place by means of the so-called RProp learning algorithm. It was found that, after the network training, the average deviation of the fuel injection quantity approximated by the network 1 from the actual fuel injection quantity, determined on an injection pump test stand, corresponded to an error of only approximately 3%. The real-time capability of the process and the simple usable sensor system in the form of the conventional pressure sensor 2 should be stressed. By means of the pattern analysis of the pressure course curves, which analyzes not only a few pressure values but the whole time series of the highly resolved pressure course at a large number of supporting points, the fuel quantity actually injected per power cycle by the respective injector 6 of the common rail injection system 4 can be determined relatively precisely by the neural network 3 which emits the corresponding injection quantity information as the only output signal 7 from its output layer 1c. The precision is so high that even cycle fluctuations of the injection quantity in the case of the same engine power point can be recognized. This permits a very precise diagnosis of the fuel injection operations of the common-rail injection system 4.

Figure 4:
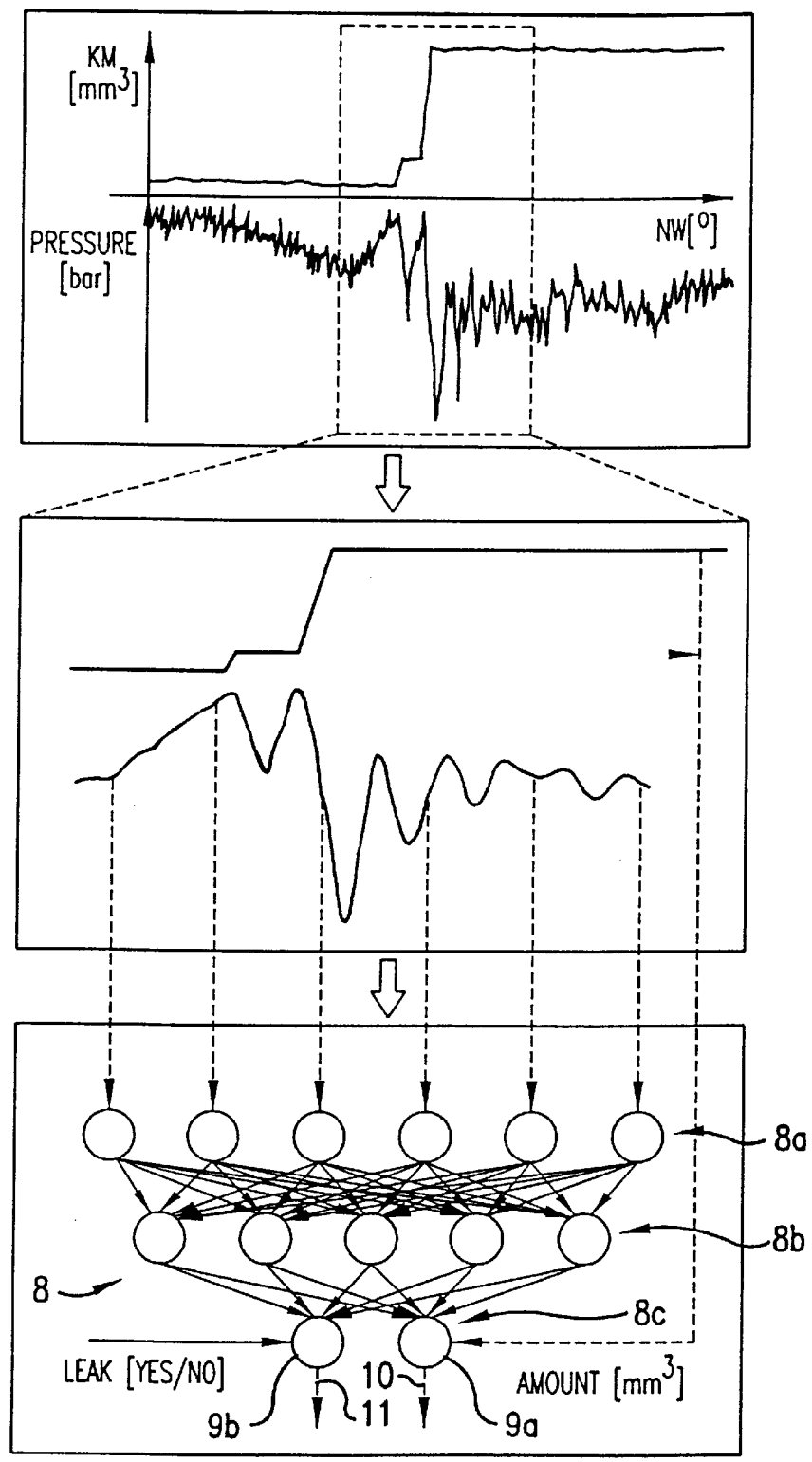
FIG. 4 is a schematic block diagram of a process similar to that of FIG. 3, but with an additional leakage recognition.

FIG. 4 is a schematic view of a second example of the process in the case of which a neural network 8 is used for implementing the pattern recognition task. The upper portion of FIG. 4 shows a diagram which, as a function of the camshaft angle NW, in the upper half, illustrates the course of the fuel injection quantity KM of a test injection operation carried out on an injection pump test stand and, in its lower half, shows the pressure course measured by a pressure sensor of the distributor pressure pipe of a common-rail injection system of a motor vehicle combustion engine. The raw output signal of the pressure sensor is then again subjected to the above-described signal preprocessing, whereby the pertaining pressure course pattern is obtained, as illustrated in the partial illustration of FIG. 4 in the lower half. In the upper half of the central partial illustration, for demonstrating the correlation between the injection course and the pressure break in the pressure course pattern, the time sequence of the fuel injection quantity is reflected in a smoothed manner in real time.

The pressure course pattern again forms an input vector for the neural network 8 which has essentially the same construction as the network 1 of FIG. 3, particularly also having an input layer 8a, a hidden layer 8b and an output layer 8c. However, in contrast to the network 1 of FIG. 3, the output layer 8c of the network 8 of FIG. 4 consists of two neurons 9a, 9b. One neuron 9a of the output layer 8c again supplies the information concerning the actually injected fuel quantity as the output signal, while the other neuron 9b emits an output signal 11 which indicates whether leakage exists in the common-rail injection system. Thus, in the case of this example of the process, as a result of the particular neural network 8 used, in addition to the determination of the fuel injection quantity, a reliable leakage recognition is implemented by means of the pattern analysis of the curve course pattern of the pressure in the distributor pressure line. It is understood that the neural network 8 is appropriately trained for fulfilling this function, which training is familiar to a person skilled in the art.

The above description of advantageous embodiments shows that, by means of the process according to the invention, a reliable and precise determination is permitted of one or more fuel-injection-quantity-relates parameter(s) in real-time individually for each injection operation of each combustion chamber of an internal-combustion engine. This process can advantageously be used, for example, for direct-injecting diesel engines of motor vehicles in order to be able to determine the injected fuel mass for each cylinder and per power cycle without taking the mean value. As a result, the combustion process in the engine can reliably be monitored with respect to this harmful-substance-relevant parameter. By means of the fuel pressure analysis according to the invention, more serious defects, such as the total breakdown of an injector, can also be recognized and diagnosed, and the defective injector can be determined, specifically in the case of a defect of a continuously open as well as of a continuously closed injector. In addition to such diagnostic purposes, the determination of one or more injection-related parameter(s) can be used for regulating the injection quantity. In particular, injection quantity regulating can be implemented by means of which aging effects, contamination phenomena and production-caused scattering in the injection behavior of the injectors are compensated.

As the result of the highly resolved analysis of the fuel pressure course during a respective injection operation, the process according to the invention is capable of determining, in the case of injection systems with a preinjection and a main injection, the preinjection quantity and the main injection quantity separately from one another in real time individually for each combustion chamber from the pressure course in the distributor pressure line of the common-rail injection system which all combustion chambers have in common. As a result, separate injection regulating can be implemented of the preinjection and the main injection. A possible precise preinjection regulating is significant, for example, for preventing the so-called black-smoke effect.

According to the application, the process according to the invention can be used for determining the injection start in addition to or instead of the described injection quantity determination. This permits the implementation of a diagnosis and/or a regulating of the injection times, the regulating being capable of compensating a production-caused scattering of the injection behavior of the injectors.

The capability of carrying out the above-mentioned regulating of injections by using the process according to the invention contributes significantly to improving the engine operation. Aging-related and fuel-caused influences can be compensated for individual vehicles.

Furthermore, an adaptation is possible to slight individual differences in the case of different engines of the same type or in the case of an aging-related change of the corresponding characteristic. A fuel charging can therefore be obtained which is optimally adapted with respect to time and quantity. The advantages are a reduction of pollutant emissions, an increase of the quiet running of the engine as well as a performance improvement and a reduction of the fuel consumption.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A process for determining individually at least one fuel-injection-related parameter for an internal-combustion engine having a common-rail fuel injection system for each engine combustion chamber and each injection operation, the process comprising the acts of:

detecting a pressure course in a distributor space pressure of the common-rail fuel injection system in a highly resolved manner for a respective fuel injection operation for a respective combustion chamber via a pressure sensor of the distributor pressure space, which space is assigned jointly to each engine combustion chamber;

obtaining a pertaining pressure course pattern from the detected pressure course; and determining individually for each combustion chamber and each injection operation the at least one fuel-injection-related parameter from the obtained pressure course pattern using pattern recognition.

2. The process according to claim 1, wherein the act of determining the at least one fuel-injection-related parameter comprises the act of supplying several functional values of the obtained pressure course pattern to a neural network as an input vector, and determining the at least one fuel-injection-related parameter via the neural network.

3. An apparatus for determining at least one fuel-injection-related parameter of an internal-combustion engine individually for each engine combustion chamber and each injection operation, comprising:

a common-rail fuel injection system assigned jointly to each engine combustion chamber, said common-rail fuel injection system having a distributor pressure space;

a pressure sensor coupled with the distributor pressure space for detecting a pressure course in the distributor pressure space in a highly resolved manner for a respective fuel injection operation for a respective combustion chamber;

means for obtaining a pertaining pressure course pattern from the detected pressure course; and means for determining at least one fuel-injection-related parameter from the obtained pressure course pattern individually for each combustion chamber and each injection operation using pattern recognition.

4. The apparatus according to claim 3, wherein the means for determining the at least one fuel-injection-related parameter is a computer neural network, wherein several functional values of the obtained pressure course are supplied to the neural network as an input vector.

* * * * *